(12) United States Patent
Sobecki et al.

(10) Patent No.: US 11,235,699 B2
(45) Date of Patent: Feb. 1, 2022

(54) ILLUMINATION MODULE FOR VEHICLE

(71) Applicant: MAGNA MIRRORS OF AMERICA, INC., Holland, MI (US)

(72) Inventors: Justin E. Sobecki, Rockford, MI (US); Jake Mohan, Grand Rapids, MI (US)

(73) Assignee: MAGNA MIRRORS OF AMERICA, INC., Holland, MI (US)

( * ) Notice: Subject to any disclaimer, the term of this patent is extended or adjusted under 35 U.S.C. 154(b) by 607 days.

(21) Appl. No.: 14/615,821

(22) Filed: Feb. 6, 2015

(65) Prior Publication Data

US 2015/0224919 A1 Aug. 13, 2015

Related U.S. Application Data

(60) Provisional application No. 61/939,766, filed on Feb. 14, 2014, provisional application No. 61/937,138, filed on Feb. 7, 2014.

(51) Int. Cl.
*G09F 19/18* (2006.01)
*B60Q 1/26* (2006.01)
(Continued)

(52) U.S. Cl.
CPC ......... *B60Q 1/2615* (2013.01); *B60Q 1/2669* (2013.01); *B60Q 1/2696* (2013.01); *B60Q 3/12* (2017.02); *B60Q 3/20* (2017.02); *B60Q 3/44* (2017.02); *G02B 3/02* (2013.01); *G02B 5/10* (2013.01); *G02B 27/0012* (2013.01); *G03B 21/00* (2013.01); *B60Q 1/2665* (2013.01); *B60Q 2400/40* (2013.01); *B60Q 2400/50* (2013.01); *G03B 21/28* (2013.01); *Y10T 29/49764* (2015.01)

(58) Field of Classification Search
CPC .......... G09F 19/18; F21V 5/008; G03B 21/00
USPC .................................... 353/13, 85; 362/339
See application file for complete search history.

(56) References Cited

U.S. PATENT DOCUMENTS 4,188,100 A * 2/1980 Prichett ................ G03B 21/001
353/46
5,014,167 A 5/1991 Roberts
(Continued)

FOREIGN PATENT DOCUMENTS

WO    WO 2005/035308 A1 * 4/2005 ............... B60Q 1/26
WO    WO2015/148611      10/2015

OTHER PUBLICATIONS

Machine Translation of WO 2005/035308A1.*

*Primary Examiner* — Jerry L Brooks
(74) *Attorney, Agent, or Firm* — Honigman LLP

(57) ABSTRACT

An illumination module configured for mounting at a vehicle includes at least one illumination source and an optic. The optic is a three dimensional single formed optic that is formed such that, when the illumination source is operated and when the illumination module is disposed at a side of a vehicle, the optic provides projection of an icon, a logo and/or indicia at a ground region at or near the side of the vehicle. The optic includes one of (a) a lens optic configured such that light emitted by the illumination source, when activated, passes through the lens optic to provide projection of the icon, the logo and/or indicia, and (b) a reflector optic configured such that light emitted by the illumination source, when activated, reflects off the reflector optic to provide the selected projection of the icon, the logo and/or indicia.

20 Claims, 12 Drawing Sheets

(51) Int. Cl.
*G02B 27/00* (2006.01)
*G02B 3/02* (2006.01)
*G02B 5/10* (2006.01)
*B60Q 3/20* (2017.01)
*B60Q 3/44* (2017.01)
*B60Q 3/12* (2017.01)
*G03B 21/00* (2006.01)
*G03B 21/28* (2006.01)

(56) References Cited

U.S. PATENT DOCUMENTS

| | | |
|---|---|---|
| 5,033,835 A | 7/1991 | Platzer, Jr. |
| 5,044,739 A | 9/1991 | do Espirito Santo |
| 5,050,977 A | 9/1991 | Platzer, Jr. |
| 5,078,480 A | 1/1992 | Warszawski |
| 5,080,492 A | 1/1992 | Platzer, Jr. |
| 5,115,352 A | 5/1992 | do Espirito Santo |
| 5,166,833 A | 11/1992 | Shyu |
| 5,178,448 A | 1/1993 | Adams et al. |
| 5,179,471 A | 1/1993 | Caskey et al. |
| 5,207,492 A | 5/1993 | Roberts |
| 5,354,965 A | 10/1994 | Lee |
| 5,355,245 A | 10/1994 | Lynam |
| 5,355,284 A | 10/1994 | Roberts |
| 5,361,190 A | 11/1994 | Roberts et al. |
| 5,371,659 A | 12/1994 | Pastrick et al. |
| 5,402,103 A | 3/1995 | Tashiro |
| 5,424,875 A | 6/1995 | Davis, II |
| 5,432,643 A | 7/1995 | Huang |
| 5,436,741 A | 7/1995 | Crandall |
| 5,448,397 A | 9/1995 | Tonar |
| 5,481,409 A | 1/1996 | Roberts |
| 5,497,305 A | 3/1996 | Pastrick et al. |
| 5,497,306 A | 3/1996 | Pastrick |
| 5,528,422 A | 6/1996 | Roberts |
| 5,535,056 A | 7/1996 | Caskey et al. |
| 5,541,825 A * | 7/1996 | Gunther ............. B60Q 1/302 340/472 |
| 5,587,699 A | 12/1996 | Faloon et al. |
| 5,594,222 A | 1/1997 | Caldwell |
| 5,619,374 A | 4/1997 | Roberts |
| 5,621,569 A | 4/1997 | Schlenke |
| 5,621,577 A | 4/1997 | Lang et al. |
| 5,632,551 A | 5/1997 | Roney et al. |
| 5,644,442 A | 7/1997 | Lemere |
| 5,649,756 A | 7/1997 | Adams et al. |
| 5,669,699 A | 9/1997 | Pastrick et al. |
| 5,669,704 A | 9/1997 | Pastrick |
| 5,669,705 A | 9/1997 | Pastrick et al. |
| 5,689,370 A | 11/1997 | Tonar et al. |
| 5,691,855 A | 11/1997 | Lupkas |
| 5,784,211 A | 7/1998 | Mingledorff |
| 5,788,357 A | 8/1998 | Muth et al. |
| 5,790,298 A | 8/1998 | Tonar |
| 5,790,327 A | 8/1998 | Lee et al. |
| 5,793,542 A | 8/1998 | Kondo et al. |
| 5,796,532 A | 8/1998 | Kanazawa |
| 5,803,579 A | 9/1998 | Turnbull et al. |
| 5,805,367 A | 9/1998 | Kanazawa |
| 5,818,625 A | 10/1998 | Forgette et al. |
| 5,823,654 A | 10/1998 | Pastrick et al. |
| 5,863,116 A | 1/1999 | Pastrick et al. |
| 5,879,074 A | 3/1999 | Pastrick |
| 5,922,176 A | 7/1999 | Caskey |
| 5,938,320 A | 8/1999 | Crandall |
| 6,005,724 A | 12/1999 | Todd |
| 6,007,222 A | 12/1999 | Thau |
| 6,030,084 A | 2/2000 | Schmidt |
| 6,032,323 A | 3/2000 | Smith et al. |
| 6,033,078 A | 3/2000 | Su et al. |
| 6,045,243 A | 4/2000 | Muth et al. |
| 6,065,840 A | 5/2000 | Caskey et al. |
| 6,074,068 A | 6/2000 | Palathingal |
| 6,074,077 A | 6/2000 | Pastrick et al. |
| 6,076,948 A | 6/2000 | Bukosky et al. |
| 6,086,229 A | 7/2000 | Pastrick |
| 6,099,155 A | 8/2000 | Pastrick et al. |
| 6,102,546 A | 8/2000 | Carter |
| 6,109,586 A | 8/2000 | Hock |
| 6,116,743 A | 9/2000 | Hoek |
| 6,149,287 A | 11/2000 | Pastrick et al. |
| 6,152,590 A * | 11/2000 | Furst ............. B60Q 1/2665 362/545 |
| 6,175,300 B1 | 1/2001 | Kendrick |
| 6,176,602 B1 | 1/2001 | Pastrick et al. |
| 6,178,034 B1 | 1/2001 | Allemand et al. |
| 6,184,800 B1 | 2/2001 | Lewis |
| 6,195,194 B1 | 2/2001 | Roberts et al. |
| 6,196,688 B1 | 3/2001 | Caskey et al. |
| 6,199,993 B1 | 3/2001 | Mou |
| 6,206,553 B1 | 3/2001 | Boddy et al. |
| 6,213,612 B1 | 4/2001 | Schnell et al. |
| 6,220,737 B1 * | 4/2001 | Baragona ............. B60Q 1/0483 362/339 |
| 6,250,148 B1 | 6/2001 | Lynam |
| 6,257,746 B1 | 7/2001 | Todd et al. |
| 6,276,821 B1 | 8/2001 | Pastrick et al. |
| 6,280,069 B1 | 8/2001 | Pastrick et al. |
| 6,296,379 B1 | 10/2001 | Pastrick |
| 6,299,333 B1 | 10/2001 | Pastrick et al. |
| 6,310,611 B1 | 10/2001 | Caldwell |
| 6,310,738 B1 | 10/2001 | Chu |
| 6,315,419 B1 | 11/2001 | Platzer, Jr. |
| 6,335,548 B1 | 1/2002 | Roberts et al. |
| 6,341,523 B2 | 1/2002 | Lynam |
| 6,343,402 B1 | 2/2002 | Smith et al. |
| 6,347,880 B1 | 2/2002 | Furst et al. |
| 6,349,450 B1 | 2/2002 | Koops et al. |
| 6,356,376 B1 | 3/2002 | Tonar et al. |
| 6,359,274 B1 | 3/2002 | Nixon et al. |
| 6,390,632 B1 | 5/2002 | Palathingal |
| 6,398,377 B1 | 6/2002 | Chou |
| 6,402,328 B1 | 6/2002 | Bechtel et al. |
| 6,416,208 B2 | 7/2002 | Pastrick et al. |
| 6,426,485 B1 | 7/2002 | Bulgajewski et al. |
| 6,441,943 B1 | 8/2002 | Roberts et al. |
| 6,441,964 B1 | 8/2002 | Chu et al. |
| 6,447,130 B2 | 9/2002 | Chu |
| 6,467,920 B2 | 10/2002 | Schnell et al. |
| 6,471,362 B1 | 10/2002 | Carter et al. |
| 6,476,358 B1 | 11/2002 | Lang et al. |
| 6,504,142 B2 | 1/2003 | Nixon et al. |
| 6,511,192 B1 | 1/2003 | Henion et al. |
| 6,512,624 B2 | 1/2003 | Tonar et al. |
| 6,521,916 B2 | 2/2003 | Roberts et al. |
| 6,522,451 B1 | 2/2003 | Lynam |
| 6,550,103 B2 | 4/2003 | Koops et al. |
| 6,568,839 B1 | 5/2003 | Pastrick et al. |
| 6,595,649 B2 | 7/2003 | Hoekstra et al. |
| 6,598,980 B2 | 7/2003 | Marusawa et al. |
| 6,612,708 B2 | 9/2003 | Chu |
| 6,616,314 B2 | 9/2003 | Thau |
| 6,650,457 B2 | 11/2003 | Busscher et al. |
| 6,657,767 B2 | 12/2003 | Bonardi et al. |
| 6,669,109 B2 | 12/2003 | Ivanov et al. |
| 6,685,347 B2 * | 2/2004 | Grutze ............. G09F 19/18 353/13 |
| 6,690,268 B2 | 2/2004 | Schofield et al. |
| 6,700,692 B2 | 3/2004 | Tonar et al. |
| 6,717,109 B1 | 4/2004 | Macher et al. |
| 6,832,848 B2 | 12/2004 | Pastrick |
| 6,907,643 B2 | 6/2005 | Koops et al. |
| 6,916,100 B2 | 7/2005 | Pavao |
| 6,919,796 B2 | 7/2005 | Boddy et al. |
| 7,073,914 B2 | 7/2006 | Pavao |
| 7,080,914 B1 | 7/2006 | Boddy |
| 7,097,312 B2 | 8/2006 | Platzer, Jr. |
| 7,126,456 B2 | 10/2006 | Boddy et al. |
| 7,147,345 B1 * | 12/2006 | Toney, Jr. ............. F21L 4/00 362/208 |
| 7,168,830 B2 | 1/2007 | Pastrick et al. |
| 7,175,321 B1 | 2/2007 | Lopez |
| 7,195,381 B2 | 3/2007 | Lynam |

(56) References Cited

U.S. PATENT DOCUMENTS

| | | |
|---|---|---|
| 7,255,451 B2 | 8/2007 | McCabe et al. |
| 7,289,037 B2 | 10/2007 | Uken et al. |
| 7,293,901 B2 | 11/2007 | Tuttle et al. |
| 7,306,355 B2 | 12/2007 | Walser et al. |
| 7,324,261 B2 | 1/2008 | Tonar et al. |
| 7,334,922 B2 | 2/2008 | Bonardi et al. |
| 7,342,707 B2 | 3/2008 | Roberts et al. |
| 7,345,680 B2 | 3/2008 | David |
| 7,372,611 B2 | 5/2008 | Tonar et al. |
| 7,377,675 B2 | 5/2008 | Pastrick et al. |
| 7,400,435 B2 | 7/2008 | Byers et al. |
| 7,423,522 B2 | 9/2008 | O'Brien et al. |
| 7,626,749 B2 | 12/2009 | Baur et al. |
| 7,748,856 B2 | 7/2010 | Zhao |
| 7,944,371 B2 | 5/2011 | Foote et al. |
| 8,058,977 B2 | 11/2011 | Lynam |
| 8,102,279 B2 | 1/2012 | Foote et al. |
| 8,305,235 B2 | 11/2012 | Foote et al. |
| 8,523,403 B2 * | 9/2013 | Pujol ............... F21V 5/008 353/85 |
| 8,525,697 B2 | 9/2013 | Foote et al. |
| 8,764,256 B2 | 7/2014 | Foote et al. |
| 8,801,245 B2 | 8/2014 | De Wind et al. |
| 8,917,437 B2 | 12/2014 | Baur et al. |
| 9,178,371 B2 | 11/2015 | Koelsch |
| 2001/0030866 A1 * | 10/2001 | Hochstein ............ F21V 29/004 362/294 |
| 2002/0036828 A1 | 3/2002 | Wong |
| 2002/0105741 A1 | 8/2002 | Platzer, Jr. |
| 2002/0159169 A1 | 10/2002 | McCord |
| 2003/0043589 A1 | 3/2003 | Blank |
| 2003/0117731 A1 | 6/2003 | Platzer, Jr. |
| 2004/0032638 A1 | 2/2004 | Tonar et al. |
| 2004/0165291 A1 | 8/2004 | Platzer, Jr. |
| 2005/0134441 A1 | 6/2005 | Somuah |
| 2005/0134983 A1 | 6/2005 | Lynam |
| 2005/0248859 A1 | 11/2005 | Platzer, Jr. |
| 2006/0056086 A1 | 3/2006 | Hannah |
| 2006/0126150 A1 | 6/2006 | Tonar et al. |
| 2006/0181772 A1 | 8/2006 | Byers et al. |
| 2006/0268440 A1 | 11/2006 | Platzer, Jr. |
| 2007/0182536 A1 | 8/2007 | Preywes |
| 2008/0225421 A1 | 9/2008 | Platzer |
| 2009/0040306 A1 | 2/2009 | Foote et al. |
| 2009/0115631 A1 | 5/2009 | Foote et al. |
| 2009/0302995 A1 | 12/2009 | Park |
| 2010/0026475 A1 | 2/2010 | Hwang |
| 2010/0039691 A1 | 2/2010 | Thomas et al. |
| 2010/0088855 A1 | 4/2010 | Ruse et al. |
| 2010/0140244 A1 | 6/2010 | Chander et al. |
| 2010/0149801 A1 * | 6/2010 | Lo ............... F21V 5/04 362/235 |
| 2010/0321946 A1 * | 12/2010 | Dingman ............ B60Q 1/2665 362/501 |
| 2011/0029777 A1 | 2/2011 | Murakami et al. |
| 2011/0052839 A1 * | 3/2011 | Pierce ............... B60R 13/005 428/31 |
| 2011/0060480 A1 | 3/2011 | Mottla et al. |
| 2011/0148575 A1 | 6/2011 | Sobecki et al. |
| 2011/0260845 A1 | 10/2011 | Henion et al. |
| 2012/0106164 A1 * | 5/2012 | Michaelis ............ G02B 3/0043 362/311.02 |
| 2012/0252480 A1 | 10/2012 | Krutt et al. |
| 2012/0259546 A1 | 10/2012 | Kim |
| 2012/0320618 A1 * | 12/2012 | Pastrick ............ B60Q 1/2665 362/520 |
| 2012/0326888 A1 | 12/2012 | Lynam |
| 2013/0109404 A1 | 5/2013 | Husney |
| 2013/0223062 A1 * | 8/2013 | Castillo ............ F21V 13/04 362/235 |
| 2013/0242586 A1 | 9/2013 | Huizen et al. |
| 2013/0249959 A1 * | 9/2013 | Umehara ............ H04N 7/142 345/690 |
| 2013/0258298 A1 * | 10/2013 | Hing-wai ............ G09F 19/18 353/94 |
| 2014/0185019 A1 * | 7/2014 | Boals ............ G09F 19/18 353/85 |

\* cited by examiner

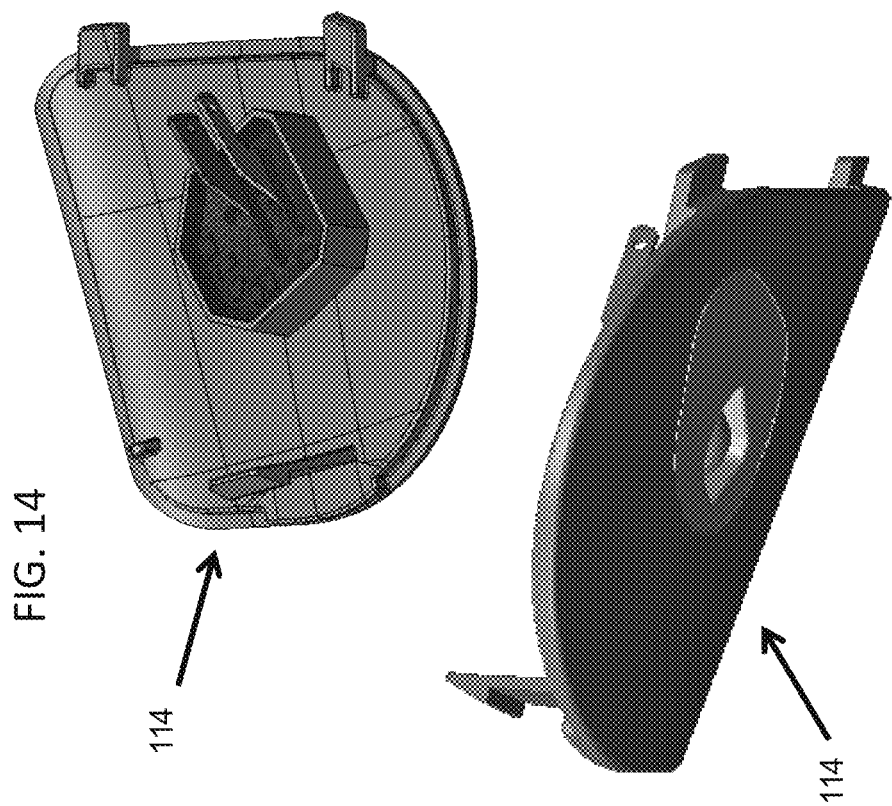
FIG. 14
FIG. 13
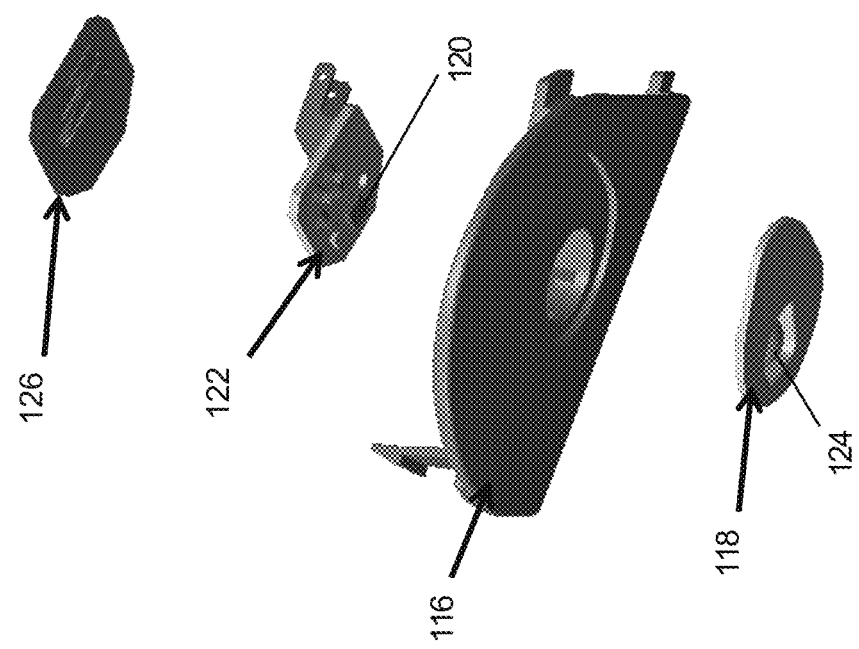
FIG. 12

Setup:
Test Height: 1300mm
Voltage: 12.5 VDC
Temperature: 23°C

GI Location

ILLUMINATION MODULE FOR VEHICLE

CROSS REFERENCE TO RELATED APPLICATIONS

The present application claims the filing benefits of U.S. provisional application Ser. No. 61/939,766, filed Feb. 14, 2014, and Ser. No. 61/937,138, filed Feb. 7, 2014, which are hereby incorporated herein by reference in their entireties.

FIELD OF THE INVENTION

The present invention relates to illumination modules for vehicles and, more particularly, to an illumination module that projects an icon or image onto the ground at or near the vehicle.

BACKGROUND OF THE INVENTION

It is known to provide illumination or light sources at the side of the vehicle, such as to provide security lighting or convenience lighting at the side of the vehicle. For example, such lighting devices are described in U.S. Pat. Nos. 6,349,450; 6,550,103; 5,371,659; 5,669,699; 5,823,654 and 5,497,305, which are hereby incorporated herein by reference in their entireties. Typically, such lighting devices provide illumination along the side of the vehicle and down to the ground at the side of the vehicle.

SUMMARY OF THE INVENTION

The present invention provides an illumination module or device for a vehicle, such as for an exterior mirror assembly, for providing illumination at the side or door of the vehicle.

According to an aspect of the present invention, an illumination module provides lighting at or along the exterior of the side of the vehicle and to project an icon or indicia or logo or the like onto the ground at or near the side of the vehicle. The illumination module includes an optic (such as a lens optic or reflector optic) that is designed via an algorithm that generates the optic that provides ground illumination and/or a projected icon or logo or indicia, with a single formed optic or lens and without masking of the optic or lens or illumination source.

The illumination module of the present invention provides a freeform optic, which provides a more efficient light module. The illumination module also provides for enhanced control of the light rays emanating from the module and optic. For example, for a projection light, the module can have a single lens with freeform optics (as compared to multi-optic lenses and separate masks or elements). The illumination module of the present invention thus provides for a projection light (that projects an icon or logo or indicia at a target area or ground area at or near the vehicle) without use of a logo mask or the like.

These and other objects, advantages, purposes and features of the present invention will become apparent upon review of the following specification in conjunction with the drawings.

BRIEF DESCRIPTION OF THE DRAWINGS

FIG. 12 is an exploded view of another illumination module of the present invention;

FIGS. 13 and 14 are perspective views of the illumination module of FIG. 12;

DESCRIPTION OF THE PREFERRED EMBODIMENTS

Figure 1:
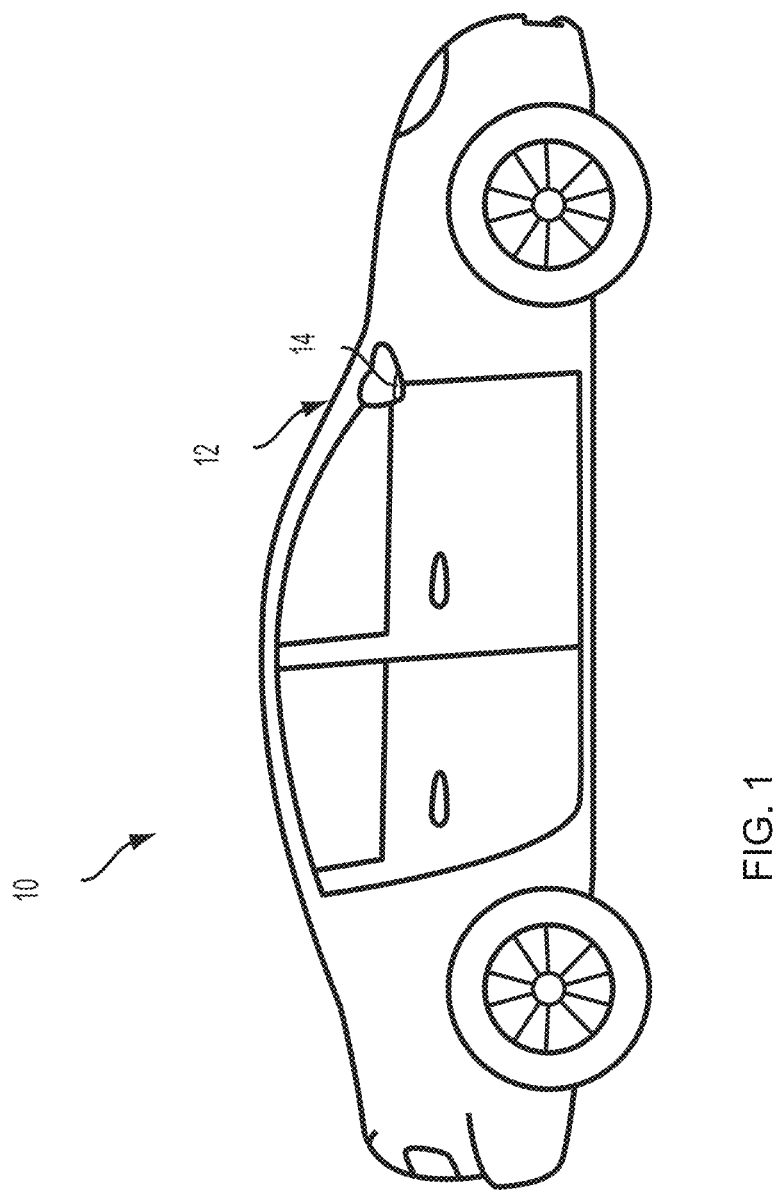
FIG. 1 is a side view of a vehicle with an illumination and projection light module at the exterior rearview mirror of the vehicle in accordance with the present invention.
Figure 2C:
FIGS. 2A-D are views of an illumination and projection light module of the present invention.
Figure 2B:
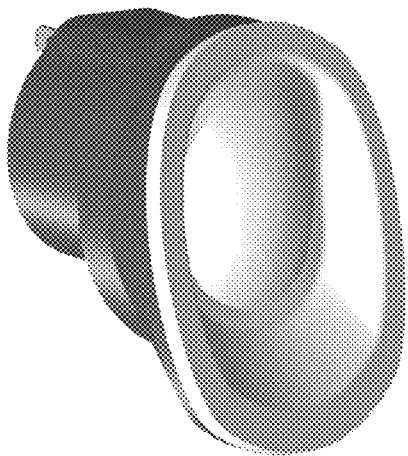
Figure 2D:
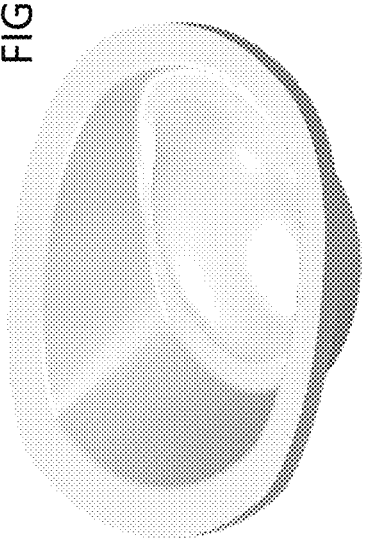
Figure 2A:
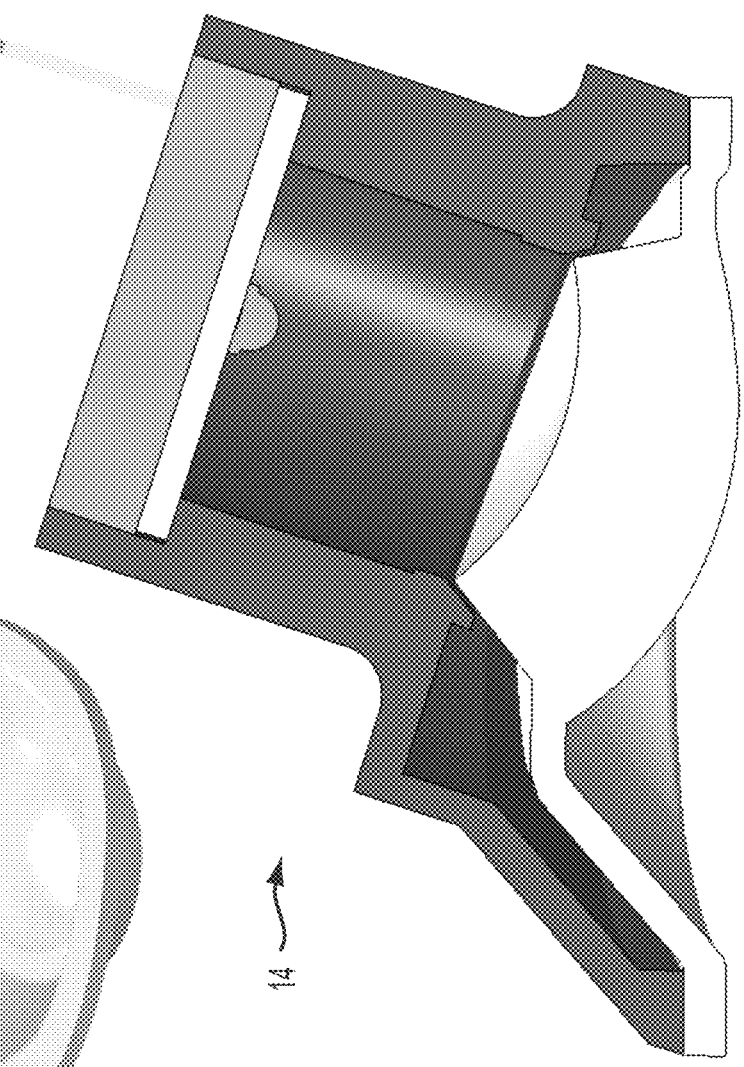
Figure 4:
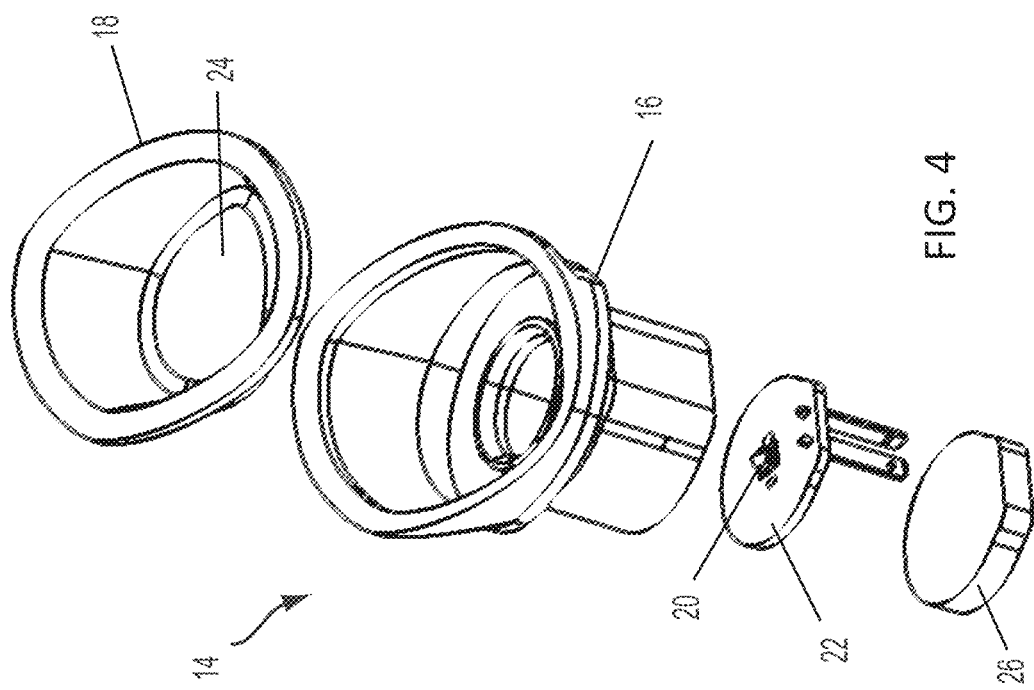
FIGS. 3 and 4 are perspective exploded views of the illumination and projection light module of the present invention.
Figure 3:
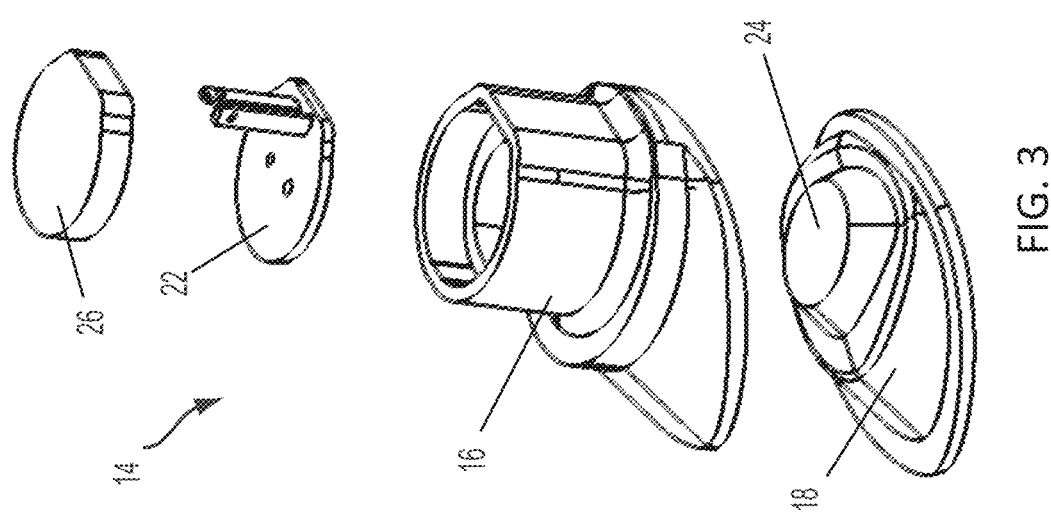

Referring now to the drawings and the illustrative embodiments depicted therein, an illumination module 14 may be disposed at a vehicle exterior rearview mirror assembly 12 or the like at a side and exterior portion of a vehicle 10, with the illumination module 14 providing (a) projection or backlighting of an image or icon or logo or indicia and (b) ground illumination. Illumination module 14 includes a housing or casing 16 that is configured to be received (and optionally snapped or otherwise secured) at or in an opening of the mirror assembly (or elsewhere at the vehicle, such as at a door handle assembly or underbody of the vehicle such as below a driver or passenger side door or the like), with an outer portion or cover 18 being at or generally flush with the outer surface of the mirror assembly or door handle or vehicle body portion at which the illumination module is mounted. The illumination module may utilize aspects of the illumination module described in U.S. Pat. No. 8,801,245, which is hereby incorporated herein by reference in its entirety.

The illumination module 14 provides a single lens projection light that projects an image of an icon or logo or indicia of the lens onto the ground at or near the side of the vehicle. By using a single optical lens with two freeform surfaces and a single light source or light emitting diode (LED), the luminance distribution at a surface can be controlled to produce an image and/or text on that surface. This system can be used to create a lighted image, logo, text, shape and/or the like very similar to multi lens projection lights (such as those described in U.S. Pat. No. 8,801,245, which is hereby incorporated herein by reference in its entirety), but the present invention provides such projection lighting without the use of multiple lenses and without a mask or separate element.

The system of the present invention utilizes tailored or customized optics to provide the desired projected image. The system uses a Mathematical Solution, which uses a series of differential equations to solve for a three dimensional (3D) surface, and which uses user inputs sources, targets, luminance, and basic lens parameters, whereby the program solves for the light entrance and light exit surfaces (such as, for example, an ffTOP mathematical solution or the like (such as described at www.fftop.eu), which can be used for the making of a free-form optic that provides an arbitrary distribution of light at a target or surface). In accordance with the present invention, such a free-formed optic provides enhanced homogeneity of light distribution or may have a patterned distribution, such as for a logo or icon or indicia.

The system or algorithm for developing the lens of the illumination module of the present invention finds a 3D design for the 3D application and Models the source as a point source. The system solves rather than optimizes and outputs a solid 3D lens. The system is operable to provide irregular targets and specific distributions. The mathematical system of equations or algorithm provides illumination design software for calculating optical freeform surfaces and solves the task to tailor or redistribute a given light source intensity distribution into nearly arbitrary irradiance distribution on a target surface. The algorithm provides a substantially exact solution of a differential equation system similar to finite element methods. Such a mathematical model or solution or algorithm is used to form a three dimensional single formed optic (having the selected or desired three dimensional surface or surfaces for providing the desired projected icon and/or illumination pattern) of a vehicular illumination module in accordance with the present invention.

Optionally, the system of the present invention may utilize tailored or customized optics to provide tailored freeform reflectors for illumination devices. For example, ground illuminators, forward spot lights and/or rearward spot lights may be constructed and optimized using a freeform reflector or freeform lens and reflector combination in accordance with the present invention.

As shown in FIGS. 2A-D and 3-6, illumination module 14 includes a light source 20 (such as one or more light emitting diodes or the like) established at a circuit board or element 22 that is disposed at a rear portion of the housing 16. The outer portion or cover 18 of illumination module 14 includes the free formed lens 24 that is formed or designed via the algorithm to provide a ground illumination or generally uniform illumination of light emitted by the light source 20 and a projected icon or indicia or logo or the like. The dual feature (ground illumination and icon projection) is provided via a single lens or optic without masking or other separate elements due to the particular form or shape of the lens.

Figure 10:
FIG. 10 is an image of a projected icon as projected by a projection light using multiple lenses and a mask to block light around the icon.
Figure 11:
FIG. 11 is an image of a projected icon as projected by a lens of the illumination and projection light module of the present invention.

FIGS. 7-9A illustrate a ground illumination light and projection light application of the illumination module of the present invention. As shown in FIGS. 7-9A, the ground illumination area may be about 600 mm×1200 mm at the ground at the side of the vehicle, with a large icon or indicia or logo shown within the ground illumination area (such as at a greater intensity illumination within the less intensity substantially uniform ground illumination). As shown in FIG. 10, a projection light may be provided using multiple lenses and a mask to block light (such as by utilizing aspects of the systems and modules described in U.S. Pat. No. 8,801,245, which is hereby incorporated herein by reference in its entirety). Optionally, and in accordance with the present invention, and such as shown in FIG. 11, a mathematical system of equations or process or algorithm may generate or design a single lens (such as a computer numeric control (CNC) cut single lens that does not include a masking element) for a projection and ground illumination light that provides a larger image that is brighter (when using the same LED or light source of the module of FIG. 10) and provides enhanced uniformity and that is designed with less design time and fewer components and provides both the icon projection feature and the ground illumination feature.

As shown in FIGS. 3-6, illumination module 14 includes a circuit element 22 (such as a printed circuit board or the like) with at least one light emitting diode 20 established thereat. In the illustrated embodiment, the circuit element 22 is supported at housing 16 so that the circuit element is angled relative to the outer cover 24 of the module. The angle of the circuit element may be selected depending on the particular application of the illumination module, and may result in light emanating from one or more illumination sources being directed generally downward and partially away from the side of the vehicle at which the illumination module is disposed. Thus, when illumination module 14 is mounted at a side of a vehicle, light emanating from the light emitting diode (when the light emitting diode 20 is powered) may be directed generally downwardly and rearwardly and/or away from the vehicle to illuminate the ground area adjacent the side of the vehicle.

Figure 5:
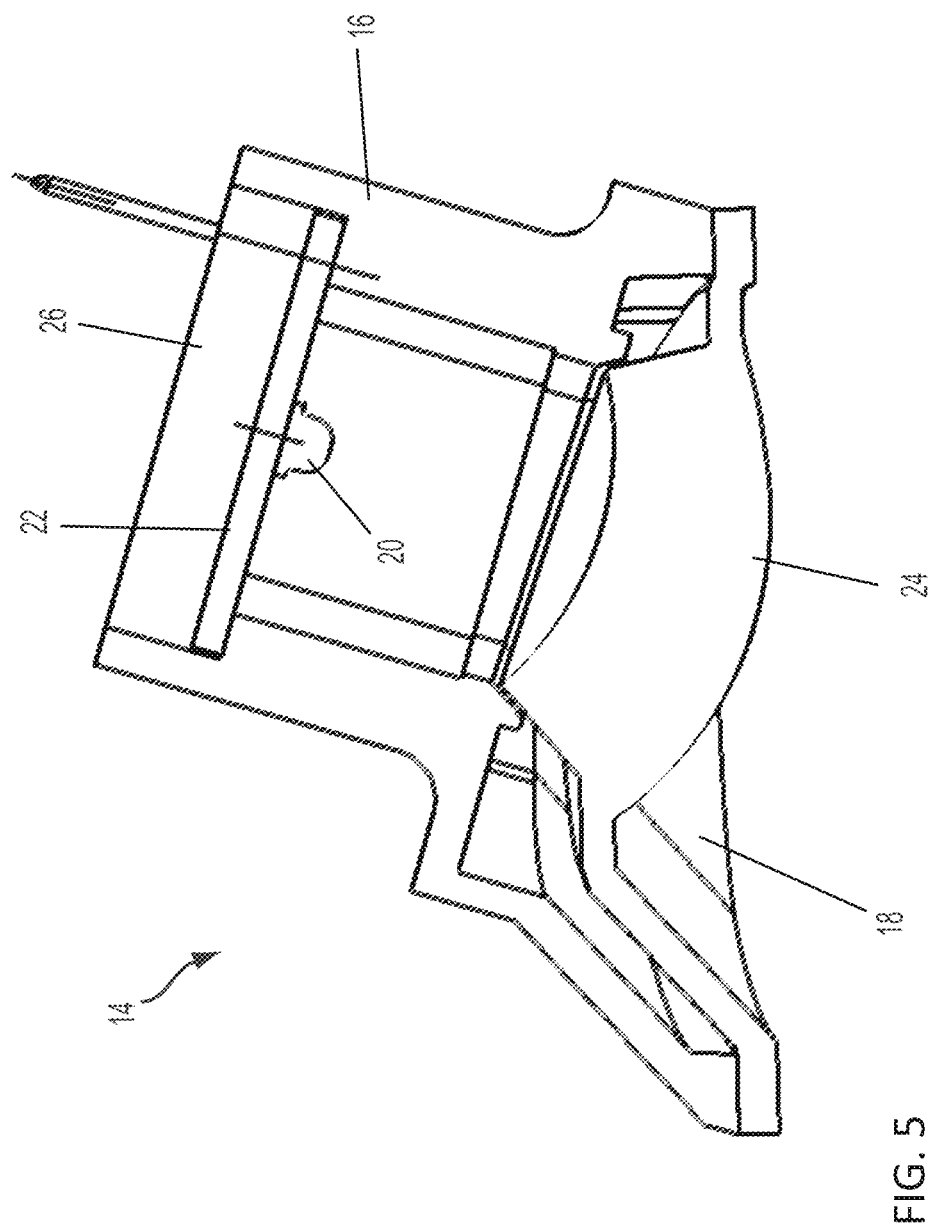
FIG. 5 is a sectional view of the illumination and projection light module of the present invention.
Figure 6:
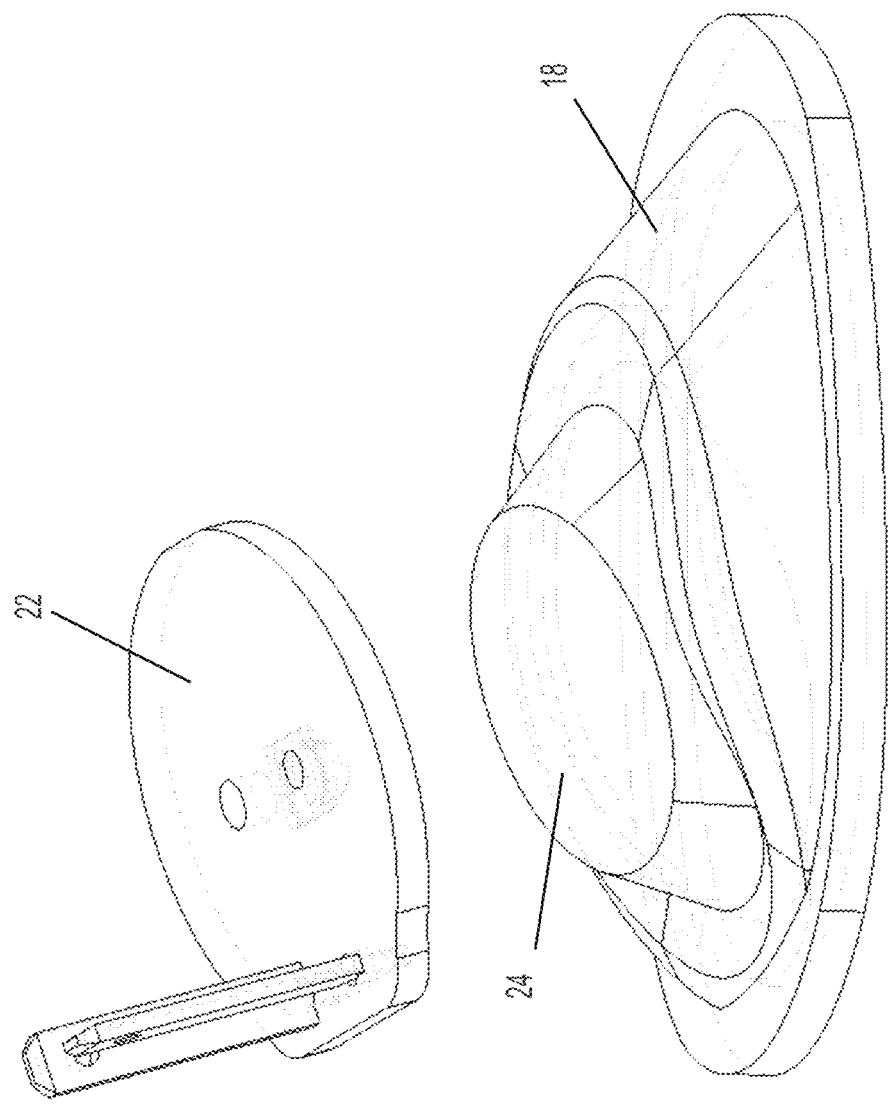
FIG. 6 is a perspective partial exploded view, showing the lens and circuit board of the illumination and projection light module of the present invention.
Figure 7:
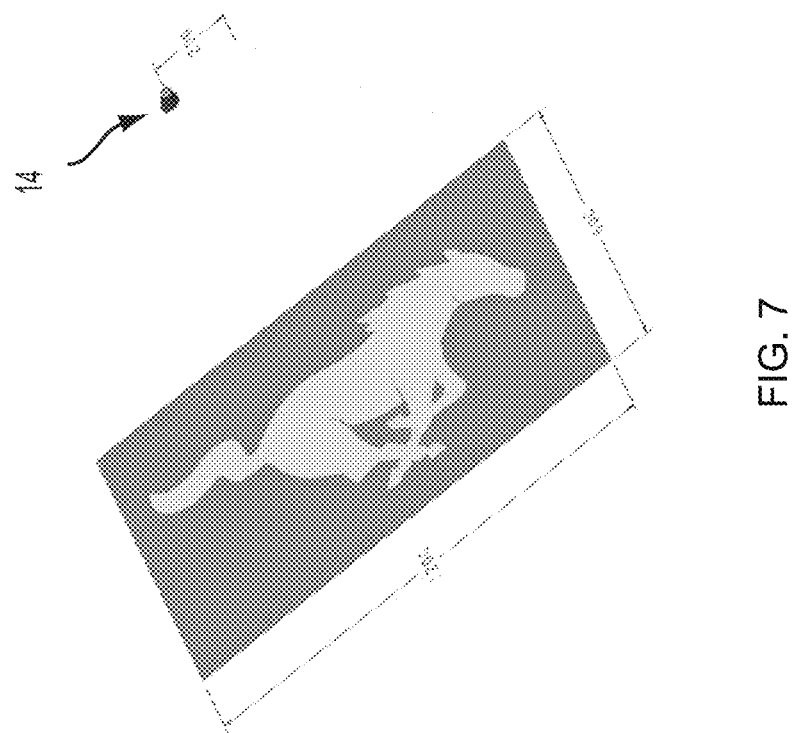
FIGS. 7-9 are images showing the illumination and projection light module and an icon projected by the module in accordance with the present invention.
Figure 8:
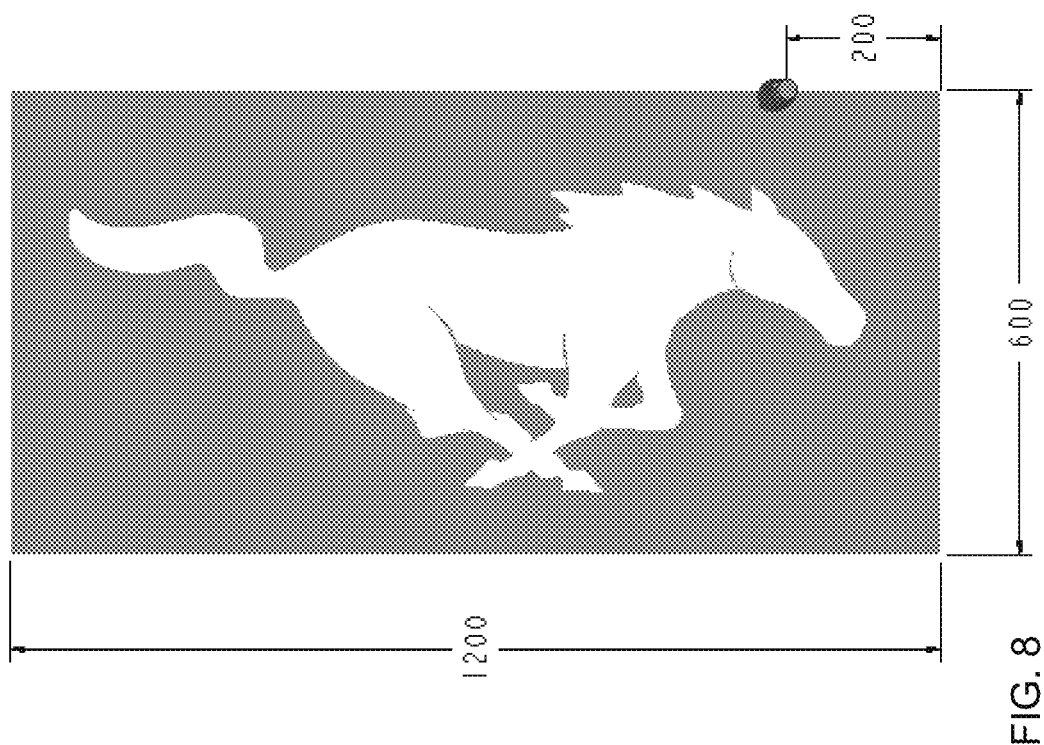
Figure 9A:
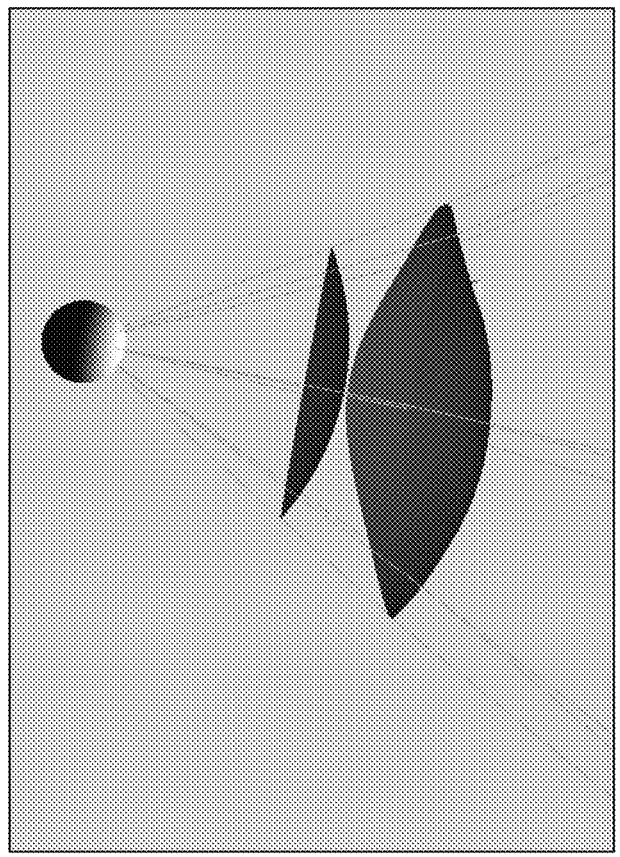
FIG. 9A is an enlarged view of the lens and light source of the illumination and projection light module of FIGS. 7-9.
Figure 9:
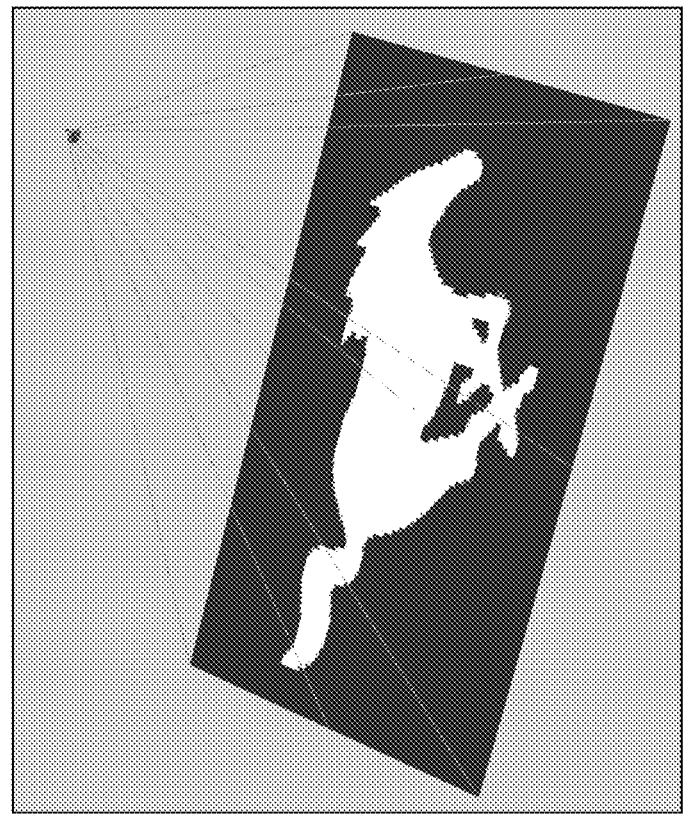

The lens 24 includes an icon or indicia or logo or the like so that, when the light emitting diode is powered, light emanating from the light emitting diode backlights an icon (or indicia or logo or the like) established at the lens so that an image of the icon is viewable at the illumination module and/or is projected by the illumination module and onto the ground area adjacent the vehicle (or elsewhere at or near the side of the vehicle depending on the lens assembly and angle of the circuit element and lens assembly). The lens may be disposed at the end of the housing of the module (such as shown in FIG. 5), or may be overmolded onto the LED or light source (in such an application, the module would include only one tailored freeform lens), while remaining within the spirit and scope of the present invention.

The cover of the illumination module 14 may be at least partially or substantially translucent or transparent at least at the illumination sources such that illumination emitted via the illumination sources is transmitted through the cover at the illumination regions and toward the vehicle side or door or ground area. The illumination regions may have a lens or aperture thereat to direct the light in the desired direction and in the desired manner. Optionally, the illumination regions of the cover may provide a diffusing optic or diffusing effect or frosting to diffuse or spread out the emitted light to provide substantially uniform illumination and to limit or substantially preclude bright spots at the vehicle side or door when the illumination source is activated.

The illumination module 14 comprises a unitary module that may be plugged in or installed or attached at an opening at a vehicle (such as an opening at a door handle or exterior rearview mirror or trim element or the like) and may comprise a substantially water impervious sealed module (optionally, with outer cover 18 comprising a unitary construction and including the lens 24 and an outer portion for sealing at and around the housing. An electrical lead (such as a pair of wires or the like) is electrically connected to circuitry at the circuit element or board 22 and may include one or more terminals extending through and from a rear portion or wall or potting 26 of the casing or housing for electrically connecting the illumination module to a power source and/or control of the vehicle and/or door and/or exterior rearview mirror assembly and/or the like.

Therefore, the illumination module provides a dual function and is operable to provide a light projection function (such as projection of white or non-white light, such as a selected color or such as a variable color or the like to optionally coordinate with an interior color scheme of the vehicle or the like) with one (or more) light emitting diode (or other suitable light source) and a ground illumination function (such as via one or more white light-emitting light emitting diodes or other suitable light source). The illumination module comprises a self-contained unitary sealed module with two light emitting diodes and the lens/light guiding element to provide the desired illumination effect with the illumination source or illumination sources.

The illumination module thus may comprise a small, self-contained module that includes a housing that substantially encases the illumination source and circuitry of the illumination module. The housing and/or cover attached thereto includes an outer wall that substantially corresponds to the contours of the mirror assembly or door handle assembly at the illumination module such that the outer vehicle surface has a substantially continuous outer surface or wall at the illumination module. The module and housing may be substantially sealed so as to be substantially impervious to water, dirt, debris and the like, so that the module is well suited for the exterior application at the vehicle exterior rearview mirror or vehicle door handle.

Thus, the light module provides the function of ground illumination and projection light by the use of a single or common light emitting diode and a freeform lens (which may be molded or otherwise formed to the desired specifications or parameters). Typically, projection lights provide a very narrow beam of light. When projected on the ground, the "illumination circle" may be about 300-500 mm. The light module of the present invention provides such illumination capability and also provides ground illumination of at least approximately 2 lux, and preferably at least approximately 4 lux, over about a 600 mm by 1200 mm generally rectangular-shaped (or other shape) ground illumination area or zone, while providing a focused projection of the icon or logo or indicia or image within the ground illumination zone. Thus, the present invention provides both a projection light and a ground illumination light with a single light module and with a single or common illumination or light source.

The illumination module thus may provide ground illumination via a lens or reflector or optic that is tailored to produce a very specific illumination pattern. For example, the illumination pattern may be uniform, or may include or provide a hot spot and gradient, or it may project or represent a logo or icon or indicia or the like. The tailoring or customizing of the lens or optic may be done by mathematical integration or by ray tracing in a 3D environment.

Optionally, the free form lens of the illumination module of the present invention may be used to provide enhanced ground illumination (without a projected icon or the like). For example, and with reference to FIGS. 12-14, a ground illumination (GI) module 114 includes a housing or casing 116 that is configured to be received (and optionally snapped or otherwise secured) at or in an opening of the mirror assembly (or housing at the vehicle, such as at a door handle assembly or the like), with an outer portion or cover 118 being at or generally flush with the outer surface of the mirror assembly or door handle at which the illumination module is mounted. As shown in FIG. 12, illumination module 114 includes a light source 120 (such as a single light emitting diode or two or more light emitting diodes or the like) established at a circuit board or element 122 that is disposed at a rear portion of the housing 116. The outer portion or cover 118 of illumination module 114 includes a free formed lens 124 that is formed or designed via the algorithm to provide a ground illumination or generally uniform illumination of light emitted by the light source 120.

The optic freeforming system of the present invention utilizes tailored or customized optics to provide the desired ground illumination range and intensity, as discussed above. The system uses the Mathematical Solution, which uses a series of differential equations to solve for a three dimensional (3D) surface, and which uses selected parameters or variables, such as user inputs sources, targets, luminance, and basic lens parameters, whereby the program solves for light entrance and light exit surfaces of the optic, as discussed above.

Figure 15:
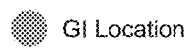
FIG. 15 shows charts comparing the illuminance of a ground illumination module of the present invention compared to the illuminance of a known ground illumination module.
Figure 15:
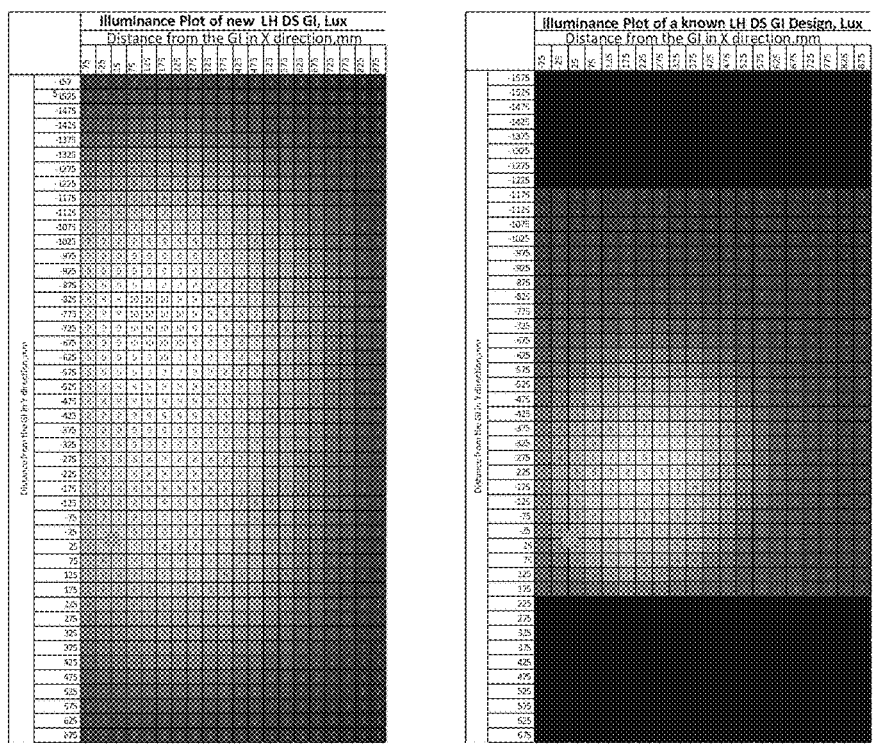
Figure 16:
FIGS. 16 and 17 are perspective views of vehicles comparing the ground illumination provided by a known ground illumination module to the ground illumination provided by the ground illumination module of the present invention.
Figure 17:

As can be seen with reference to FIGS. 15-17, the ground illumination module of the present invention (with a freeform lens as described above) provides enhanced intensity or illuminance at the ground area at the side of the vehicle and over a larger area or ground region or illumination zone at the side of the vehicle at which the illumination module is mounted. FIGS. 16 and 17 illustrate the difference in light output between a known illumination module and optic (FIG. 16) and the illumination module and freeform lens of the present invention (FIG. 17), assuming the same packaging space and same illumination source or light emitting diode.

Similar to illumination module 14, discussed above, illumination module 114 may comprise a unitary module that may be plugged in or installed or attached at an opening at a vehicle (such as an opening at a door handle or exterior rearview mirror or trim element or the like) and may comprise a substantially water impervious sealed module (optionally, with the outer cover 118 comprising a unitary construction and including the lens 124 and an outer portion for sealing at and around the housing. An electrical lead (such as a pair of wires or the like) is electrically connected to circuitry at the circuit element or board 122 and may include one or more terminals extending through and from a rear portion or wall or potting 126 of the casing or housing for electrically connecting the illumination module to a power source and/or control of the vehicle and/or door and/or exterior rearview mirror assembly and/or the like.

As discussed above, the illumination module includes at least one illumination source or light source (such as a light emitting diode (LED) or electroluminescence light source or the like) that is operable to emit illumination, such as in response to a triggering or activating device or event. For example, the illumination source may be actuatable in response to at least one of a touch of the door handle, a movement of the strap or handle portion, actuation of a remote keyless entry module, or passive entry device, a motion detection at the vehicle, an insertion of a key into a keyhole at the door handle, and/or activation or deactivation or operation of a security system of the vehicle. Preferably, the illumination source is deactuatable following a period of time after actuation of the illumination source. Optionally, the light module and/or illumination source or sources may have a dimming control feature or function, such that the illumination source, when activated, is ramped up or progressively powered up to its full illumination state, and when deactivated, is ramped down or dimmed or progressively powered down to its deactivated state.

The illumination source may comprise any suitable illumination source, such as one or more light emitting diodes (LEDs), such as white light-emitting LEDs or high intensity power LEDs (such as the types described in U.S. Pat. Nos. 7,195,381 and/or 6,690,268, which are hereby incorporated herein by reference in their entireties) or organic light emitting diodes (OLEDs) or electroluminescent light sources or the like. The illumination source may comprise a substantially white light-emitting illumination source, or may comprise a colored light-emitting illumination source (or a white light-emitting illumination source may emit light that passes through a color filter or the like) to provide color illumination (such as blue or other color as desired) at the vehicle side area depending on the particular application of the illumination module. For example, the illumination module may emit or transmit colored light that may match or correspond to the interior and/or exterior lighting of the particular vehicle to which the illumination module is mounted.

The illumination module may provide a cover and icon film or template that provides a display of a vehicle logo or the like (or any other vehicle logo or brand name or custom display icon or indicia or the like). Thus, the illumination modules may provide a back lit icon or indicia or logo or emblem to provide enhanced ground illumination at the side of a vehicle. The icon or indicia or logo or emblem may comprise the vehicle manufacturer logo or the like, or may comprise a selected icon or indicia or logo, such as may be selected by the owner of the vehicle. For example, the owner of the vehicle may select a module having a desired icon or indicia or logo element or optical properties and the selected illumination module may be installed in the vehicle door handle and/or mirror assembly (or elsewhere on the vehicle, such as at or on or in the vehicle door or at or on or in a side panel of the vehicle or the like) to provide the customized or personalized ground illumination function. Such a selection and installation of the illumination module may be performed during manufacturing of the vehicle or as an aftermarket change to the vehicle. The icon illumination module thus may provide a personalized or customized illumination at the side of the vehicle, such as by utilizing aspects of the systems and assemblies described in U.S. Pat. Nos. 7,626,749; 7,255,451 and/or 7,289,037, which are hereby incorporated herein by reference in their entireties. Optionally, the illumination module may be disposed at an exterior rearview mirror assembly of the vehicle (such as at the housing of the mirror assembly or in the housing and behind the reflective element so as to be viewable through the reflective element) or the like, or may be disposed elsewhere at the exterior of the vehicle, such as at a door handle of the vehicle or the like. Optionally, an illumination module with a backlit icon of the types described above may be disposed at an interior portion of a vehicle, such as at an interior rearview mirror assembly (such as at a mirror casing or behind a reflective element and viewable through the reflective element or the like) of the vehicle or such as at or proximate to the interior door lock button or switch or the like. The illumination module thus may provide a security indicator function at the interior rearview mirror assembly or elsewhere in the interior cabin of the vehicle.

Optionally, and desirably, the cover and/or housing may be overmolded over the illumination source or sources and circuitry to provide a substantially sealed and substantially water impervious illumination module. For example, the housing may be overmolded over and around a metal stamping or stamped circuit element or plate with the illumination source or sources (such as LEDs or the like) fastened thereto or otherwise established thereon, or the housing may be overmolded over and around a printed circuit board or element with the illumination sources established thereon.

Thus, the illumination module of the present invention comprises a small illumination device or module that is disposed at an exterior rearview mirror or handle portion of a vehicle door handle assembly, and is operable to backlight or project an icon or image towards a ground area at or near the side of the vehicle. The illumination or backlighting intensity may be low enough to provide a glow at the logo or icon or beacon, yet high enough to be seen or discerned in high ambient or daytime lighting conditions. Optionally, the backlighting intensity may be controlled or adjusted or varied, such as in response to an ambient light sensor, so that the backlighting intensity is increased during daytime lighting conditions and decreased or activated at a reduced intensity during nighttime lighting conditions.

The tailored or customized optics (such as lenses or reflectors) of the present invention may be used in the illumination modules of exterior mirrors or door handles or the like. Optionally, aspects of the tailored or customized optics (such as lenses or reflectors) of the present invention may be used on other vehicle illumination devices, such as, for example, inside mirror map lights, inside mirror map lights with logos, light modules in door handles (such as ground illumination or strip lights or pocket lights or the like), video screen back lights, blind zone indicator modules, condenser lenses for projection light modules, other back lighted logos or indicators which may have a LED and a free-form lens which would uniformly illuminate a masked diffuser, turn signals and/or the like, while remaining within the spirit and scope of the present invention.

Thus, the present invention provides an illumination module at an exterior portion of the vehicle. Optionally, the illumination device or module of the present invention may be operable as an indicator to provide the driver with feedback as the driver or user or operator uses his or her key fob or as the passive or keyless entry system (PKE system) of the vehicle operates. Optionally, the illumination device or module may display vehicle logos or the like, and may use variable color LEDs that could be linked to an interior lighting system of the vehicle, such as to a MYCOLOR™ interior lighting system of the vehicle or the like.

Although shown and described as being disposed at an exterior rearview mirror assembly and/or door handle and/or exterior portion of a vehicle for providing illumination at a side of a vehicle, it is envisioned that the light module of the present invention is suitable for other applications. For example, a light module of the present invention may be disposed at an interior portion of a vehicle, such as at an interior rearview mirror assembly (such as at a mirror casing or behind a reflective element and viewable through the reflective element or the like) of the vehicle or the like, whereby actuation of the light module may provide broad illumination of the dashboard and/or instrument panel of the vehicle (generally beneath the mirror assembly), and may project a beam of light to illuminate (such as at a greater intensity of light as compared to the broad illumination) a targeted portion of the interior of the vehicle (such as for map reading or the like). Also, for example, a light module of the present invention may be suitable for use in non-automotive lighting applications, such as residential lighting or commercial lighting or the like. For example, a light module of the present invention may be converted to replace a household or residential or commercial business or office building light bulb, whereby the light module may provide normal lighting (that broadly illuminates the area surrounding the light module) in addition to projection lighting, such as in a similar manner as described above.

Optionally, the illumination module and/or an exterior rearview mirror assembly of the vehicle may incorporate a blind spot indicator device or element and/or a turn signal indicator device or element, such as by utilizing aspects of the devices described in U.S. Pat. Nos. 8,786,704; 8,058,977; 7,944,371; 7,492,281; 6,198,409; 5,929,786 and/or 5,786,772, which are hereby incorporated herein by reference in their entireties. The signal indicator or indication module may include or utilize aspects of various light modules or systems or devices, such as the types described in U.S. Pat. Nos. 7,581,859; 6,227,689; 6,582,109; 5,371,659; 5,497,306; 5,669,699; 5,823,654; 6,176,602 and/or 6,276,821, and/or International Publication No. WO 2006/124682, which are hereby incorporated herein by reference in their entireties. Optionally, the exterior rearview mirror assembly may include a wide angle reflector at or integral with the reflective element, such as by utilizing aspects of the elements described in U.S. Pat. Nos. 8,786,704; 7,748,856; 7,255,451; 7,195,381; 6,717,712; 7,126,456; 6,315,419; 7,097,312 and/or 6,522,451, which are hereby incorporated herein by reference in their entireties.

Changes and modifications to the specifically described embodiments may be carried out without departing from the principles of the present invention, which is intended to be limited only by the scope of the appended claims as interpreted according to the principles of patent law.

The invention claimed is:

1. An illumination module for a vehicle, said illumination module configured for mounting at a side of a vehicle, said illumination module comprising:

an illumination source and a three dimensional single formed lens optic;

wherein said illumination source comprises a single light emitting diode;

wherein said single light emitting diode is mounted at a circuit board;

wherein said circuit board is accommodated at an upper end of a housing of said illumination module, and wherein a plurality of electrical terminals extend from said circuit board;

wherein an outer cover is disposed at a lower end of said housing;

wherein said three dimensional single formed lens optic is disposed at said lower end of said housing;

wherein said circuit board is angled relative to said outer cover;

wherein, when said single light emitting diode is operated to emit light and when said illumination module is mounted at a side of a vehicle equipped with said illumination module, emitted light passes through said three dimensional single formed lens optic;

wherein said three dimensional single formed lens optic is configured such that light emitted by said single light emitting diode that passes through said three dimensional single formed lens optic provides a ground illumination pattern projected, without masking, over an illuminated ground region at or near the side of the equipped vehicle at which said illumination module is mounted;

wherein the ground illumination pattern comprises (a) general illumination of the illuminated ground region and (b) within the illuminated ground region, at least one of (i) an icon projected onto a portion of the illuminated ground region at or near the side of the equipped vehicle, wherein the projected icon has a light intensity greater than illumination of the illuminated ground region adjacent to the projected icon, (ii) a logo projected onto a portion of the illuminated ground region at or near the side of the equipped vehicle, wherein the projected logo has a light intensity greater than illumination of the illuminated ground region adjacent to the projected logo, and (iii) indicia projected onto a portion of the illuminated ground region at or near the side of the equipped vehicle, wherein the projected indicia has a light intensity greater than illumination of the illuminated ground region adjacent to the projected indicia; and wherein, with said illumination module mounted at the side of the equipped vehicle and when said single light emitting diode is operated to emit light, the general illumination of the illuminated ground region comprises illumination of at least 2 lux over a 600 mm by 1200 mm rectangular-shaped illuminated ground region.

2. The illumination module of claim 1, wherein said three dimensional single formed lens optic is configured such that light emitted by said single light emitting diode that passes through said three dimensional single formed lens optic provides, due to the shape of said three dimensional single formed lens optic and without masking, the ground illumination and the at least one of (i) an icon, (ii) a logo and (iii) indicia.

3. The illumination module of claim 1, wherein said illumination module is substantially water impervious.

4. The illumination module of claim 1, wherein said three dimensional single formed lens optic comprises a three dimensional single formed freeform lens optic, and wherein said three dimensional single formed freeform lens optic provides a three dimensional surface that, when light that is emitted by said single light emitting diode passes through said three dimensional single formed freeform lens optic, said three dimensional single formed freeform lens optic provides, due to the shape of the three dimensional surface, the general illumination of the illuminated ground region and the at least one of (i) an icon onto projected a portion of the illuminated ground region at or near the side of the equipped vehicle, (ii) a logo projected onto a portion of the illuminated ground region at or near the side of the equipped vehicle and (iii) indicia projected onto a portion of the illuminated ground region at or near the side of the equipped vehicle.

5. The illumination module of claim 4, wherein mathematical equations are processed responsive to selected parameters, and wherein, responsive to the selected parameters, the mathematical equations are solved to establish the light entrance and light exit surfaces of said three dimensional single formed freeform lens optic.

6. The illumination module of claim 5, wherein the selected parameters comprise at least one of (i) selected targets, (ii) selected luminance and (iii) selected optic parameters.

7. The illumination module of claim 1, wherein the general illumination of the illuminated ground region is a particular illumination pattern established by formed surfaces of said three dimensional single formed lens optic.

8. The illumination module of claim 1, wherein said three dimensional single formed lens optic is configured such that light emitted by said by said single light emitting diode that passes through said three dimensional single formed lens optic provides the general illumination of the illuminated ground region and an icon projected onto the portion of the illuminated ground region at or near the side of the equipped vehicle.

9. The illumination module of claim 1, wherein said three dimensional single formed lens optic is overmolded over said single light emitting diode.

10. A method of making an illumination module for a vehicle, said method comprising:
providing an illumination source, wherein said illumination source comprises a single light emitting diode;
mounting the single light emitting diode at a circuit board, wherein a plurality of electrical terminals extend from the circuit board;
determining a light pattern that is to be emitted by said illumination module when said illumination source is activated and when said illumination module is mounted at a side of a vehicle equipped with said illumination module;
determining three dimensional surfaces of a three dimensional single formed lens optic so that light passing through or reflecting off said three dimensional single formed lens optic corresponds to the determined light pattern;
forming said three dimensional single formed lens optic with the determined three dimensional surfaces, wherein said three dimensional single formed lens optic is configured so that light passing through said lens optic corresponds to the determined light pattern;
assembling said illumination module with said three dimensional single formed lens optic and said illumination source, such that light emitted by said illumination source, when activated, that passes through said three dimensional single formed lens optic provides the determined light pattern without masking;
wherein assembling said illumination module comprises accommodating said circuit board at an upper end of a housing of said illumination module;
wherein assembling said illumination module comprises disposing an outer cover at a lower end of said housing;
wherein assembling said illumination module comprises disposing said three dimensional single formed lens optic at said lower end of said housing;
wherein, with said illumination module assembled, said circuit board is angled relative to said outer cover;
wherein the determined light pattern provided by said three dimensional single formed lens optic comprises a ground illumination pattern, and wherein the ground illumination pattern, when said illumination module is mounted at the side of the equipped vehicle, comprises (a) general illumination of an illuminated ground region and (b) within the illuminated ground region, at least one of (i) an icon, (ii) a logo and (iii) indicia, such that, when said illumination module is mounted at the side of the equipped vehicle and when said illumination source is activated, light emitted by said illumination source that passes through said three dimensional single formed lens optic provides (a) general illumination over the illuminated ground region at or near the side of the equipped vehicle at which said illumination module is mounted and (b) at least one of (i) an icon projected onto a portion of the illuminated ground region at or near the side of the equipped vehicle, wherein the projected icon has a light intensity greater than illumination of the illuminated ground region adjacent to the projected icon, (ii) a logo projected onto a portion of the illuminated ground region at or near the side of the equipped vehicle, wherein the projected logo has a light intensity greater than illumination of the illuminated ground region adjacent to the projected logo and (iii) indicia projected onto a onto a portion of the illuminated ground region at or near the side of the equipped vehicle, wherein the projected indicia has a light intensity greater than illumination of the illuminated ground region adjacent to the projected indicia; and
wherein, with said illumination module mounted at the side of the equipped vehicle and when said single light emitting diode is operated to emit light, the general illumination of the illuminated ground region comprises illumination of at least 2 lux over a 600 mm by 1200 mm rectangular-shaped illuminated ground region.

11. The method of claim 10, wherein the determined light pattern comprises an illumination pattern that illuminates an area at or near said illumination module.

12. The method of claim 10, wherein determining a light pattern comprises determining a light pattern that provides a higher intensity illumination region at the illuminated ground region and lesser intensity illumination regions at the illuminated ground region.

13. The method of claim 10, wherein determining three dimensional surfaces of said three dimensional single formed lens optic comprises processing mathematical equations to provide three dimensional surfaces that, when light passes through the three dimensional single formed lens optic, provide the determined light pattern.

14. The method of claim 13, wherein the mathematical equations are processed responsive to selected parameters, and wherein, responsive to the selected parameters, the mathematical equations are solved to establish the three dimensional surfaces of said three dimensional single formed lens optic.

15. The method of claim 10, wherein said three dimensional single formed lens optic is configured such that, when said illumination module is mounted at the side of the equipped vehicle and when said single light emitting diode is activated, light emitted by said single light emitting diode that passes through said three dimensional single formed lens optic provides, due to the shape of said three dimensional single formed lens optic and without masking, the ground illumination and the at least one of (i) an icon, (ii) a logo and (iii) indicia.

16. The method of claim 10, wherein forming said three dimensional single formed lens optic comprises overmolding said three dimensional single formed lens optic over said single light emitting diode.

17. An illumination module for a vehicle, said illumination module configured for mounting at a side of a vehicle, said illumination module comprising:
an illumination source and a three dimensional single formed freeform lens optic, wherein said illumination source comprises a single light emitting diode;
wherein said single light emitting diode is mounted at a circuit board;
wherein said circuit board is accommodated at an upper end of a housing of said illumination module, and wherein a plurality of electrical terminals extend from said circuit board;
wherein an outer cover is disposed at a lower end of said housing;
wherein said three dimensional single formed lens optic is disposed at said lower end of said housing;
wherein said circuit board is angled relative to said outer cover;

wherein said illumination module comprises a substantially sealed module such as to be substantially water impervious;

wherein said three dimensional single formed freeform lens optic is formed such that, when said single light emitting diode is operated and when said illumination module is mounted at a side of a vehicle equipped with said illumination module, light emitted by said single light emitting diode that passes through said three dimensional single formed lens optic provides general ground illumination over an illuminated ground region at or near the side of the equipped vehicle at which said illumination module is mounted;

wherein said three dimensional single formed freeform lens optic is formed such that, when said single light emitting diode is operated and when said illumination module is mounted at the side of the equipped vehicle, light emitted by said single light emitting diode that passes through said three dimensional single formed freeform lens optic projects at least one of (i) an icon, (ii) a logo and (iii) indicia within the illuminated ground region;

wherein said three dimensional single formed freeform lens optic is configured such that, with said illumination module mounted at the side of the equipped vehicle, light emitted by said single light emitting diode that passes through said three dimensional single formed freeform lens optic at least one of (i) provides an icon projected onto a portion of the illuminated ground region at or near the side of the equipped vehicle, wherein the projected icon has a light intensity greater than illumination of the illuminated ground region adjacent to the projected icon, (ii) provides a logo projected onto a portion of the illuminated ground region at or near the side of the equipped vehicle, wherein the projected logo has a light intensity greater than illumination of the illuminated ground region adjacent to the projected logo, and (iii) provides indicia projected onto a portion of the illuminated ground region at or near the side of the equipped vehicle, wherein the projected indicia has a light intensity greater than illumination of the illuminated ground region adjacent to the projected indicia;

wherein said three dimensional single formed freeform lens optic provides three dimensional surfaces that, when light passes through said three dimensional single formed freeform lens optic, provide, without masking, the at least one of (i) an icon projected onto the portion of the illuminated ground region at or near the side of the equipped vehicle, (ii) a logo projected onto the portion of the illuminated ground region at or near the side of the equipped vehicle and (iii) indicia projected onto the portion of the illuminated ground region at or near the side of the equipped vehicle; and wherein, with said illumination module mounted at the side of the equipped vehicle and when said single light emitting diode is operated to emit light, the general ground illumination over the illuminated ground region comprises illumination of at least 2 lux over a 600 mm by 1200 mm rectangular-shaped illuminated ground region.

18. The illumination module of claim 17, wherein the ground illumination comprises a particular illumination pattern established by the formed three dimensional surfaces of said three dimensional single formed freeform lens optic, and wherein the particular illumination pattern comprises a higher intensity illumination region at the illuminated ground region and a lesser intensity illumination region at the illuminated ground region at or near the side of the equipped vehicle.

19. The illumination module of claim 17, wherein said three dimensional single formed freeform lens optic is configured such that light emitted by said single light emitting diode that passes through said three dimensional single formed freeform lens optic provides, due to the shape of said three dimensional single formed freeform lens optic and without masking, the ground illumination and the at least one of (i) an icon, (ii) a logo and (iii) indicia.

20. The illumination module of claim 1, wherein potting material is disposed at and over said circuit board to seal said circuit board at said upper end of said housing, and wherein said plurality of electrical terminals extend through said potting material for electrical connecting said illumination module to an electrical connector at the side of the equipped vehicle when said illumination module is mounted at the side of the equipped vehicle.

* * * * *